Patented June 10, 1930

1,763,102

UNITED STATES PATENT OFFICE

ALFRED OBERLE, OF OAK PARK, ILLINOIS

CARBONACEOUS MATERIAL AND PROCESS OF MAKING THE SAME

No Drawing.   Application filed January 31, 1925.   Serial No. 6,157.

This invention relates to improvements in a carbonaceous material and process for making the same, and refers more particularly to the manufacture or production of a carbonaceous substance such as that described in my co-pending application Serial No. 672,648 adapted to be molded into any desired form and particularly for use in electrical devices for electrodes, carbon brushes for dynamos, generators and for like purposes.

The invention has for its novelty the utilization of a petroleum carbon and a carbonaceous substance produced from a cellulose organic material such as sawdust, wood flour or the like, and combining these substances to form a homogeneous mixture or mass. It has also for one of the particular advantages the utilization of the sludge acid material resulting from the treatment of hydrocarbons,—this sludge acid material serving to break down and disintegrate the organic material and assist in its more effective combination with the petroleum carbon.

In practicing the invention, petroleum carbon, such as that which is recovered from the cracking or destructive distillation of hydrocarbon oils, also such materials as are produced by the burning of oils with an insufficient amount of air and other carbonaceous substances produced from hydrocarbons, are mixed with a sludge acid which is the bottom settling or material resulting from acid treated hydrocarbons. This acid sludge contains a considerable amount of gummy, resinous materials and, in the case of certain oils, asphaltic bottom settlings together with the acid such as sulphuric or other acid materials which may be used in a refining treatment. To this petroleum-carbon-sludge-acid mixture is added sawdust and the combination ground and agitated together or combined with a mechanical mixer to produce a uniform homogeneous mass. This mixture is then given time to react,—the acid attacking the organic material or cellulose constituents of the organic substance as well as the petroleum carbon. When this reaction is completed, the mass is treated with superheated steam at temperatures not to exceed 1500° C. Normally, temperatures will be somewhat below this. By this superheated steam treatment, the volatile material in the mixture is driven off, including such constituents as may be carried along mechanically, until there is left a mass in a plastic or semi-plastic state. Under certain conditions it may be desirable to reduce the mass to a dry condition which may be subsequently ground to a predetermined degree of fineness and molded by recombining it with an adhesive.

An alternate manner of practicing the invention is to reduce the mass to a plastic or semiplastic state and mold the material immediately with the adhesive originally contained in the mass which may consist of certain relatively high boiling point asphaltic or resinous substances having pronounced adhesive proclivities. If the substance is treated to a dry state—either by means of superheated steam or by a subsequent carbonizing treatment with external heat after the steam treatment—the resulting material has the characteristics of activated carbon,—and may be utilized for all of the purposes to which activated carbon is employed.

The volatile materials driven off by the heat, either with or without the use of steam, may be recovered in a subsequent condensation stage, that is, by reducing the temperature of the material carried overhead by fractionation or condensation.

From the description of the process, a relatively comprehensive idea of the resulting product may be ascertained. The acid contained in the sludge has the function of first breaking down or attacking the cellulose constituents or organic material in the sawdust, wood flour or the like, and serving also as a vehicle to carry this disintegrated organic material into the body of the petroleum carbon. It also carries carbonaceous, resinous or binding material into the cellulose substance. On subsequent treatment and carbonization the carbonized organic material is found in intimate combination with the petroleum carbon, producing a substance which has the effect of both highly active petroleum carbon and charcoal produced from the carbonization of wood. The combination of the carbonized organic material and petroleum carbon, forms a more uniform and effective activated carbonaceous substance than is produced by the simple carbonization of the petroleum carbon or cellulose material.

The process serves also as a means for utilizing such sludge acid and sawdust—materials which have heretofore been considered as waste—together with the petroleum carbon which has been utilized to a limited extent for fuel purposes but is objectionable due to difficulties in the proper consumption and difficulties caused by improper and incomplete combustion, due to the fact that the volatile material contained in the petroleum carbon will exert an explosive effect when a certain temperature is obtained.

The resulting material produced from the combination and steam treatment with a subsequent carbonizing treatment, has been successfully utilized for electrical purposes and as an activated carbonaceous material.

I claim as my invention:

1. A process of making carbonaceous material including the steps of combining petroleum carbon, an acid sludge and sawdust, allowing a sufficient period of time to elapse for the acid to attack and disintegrate the cellulose or wood-like material of plant origin, treating with steam to drive off the volatile constituents and recovering the intimate mixture of the acid treated cellulose or wood-like material of plant origin and petroleum carbon.

2. A process of making carbonaceous material including the steps of combining petroleum carbon, an acid sludge and sawdust, allowing a sufficient period of time to elapse for the acid to attack and disintegrate the cellulose or wood-like material of plant origin, treating with steam to drive off the volatile constituents and recovering the intimate mixture of the acid treated cellulose or wood-like material of plant origin and petroleum carbon and subjecting the mixture to a subsequent carbonizing treatment.

3. A process of making carbonaceous material including the steps of combining petroleum carbon, an acid sludge and sawdust, allowing a sufficient period of time to elapse for the acid to attach the cellulose or wood-like material of plant origin, subjecting the mixture to the action of superheated steam and a carbonizing treatment to further reduce the mixture, grinding and mixing with an adhesive to produce a moldable mass.

4. A process of making active carbonaceous material, comprising the steps of combining cellulose or wood like material of plant origin with sludge acid and petroleum carbon, then heating the mixture in the presence of steam to a temperature not in excess of 1500° C.

5. An active carbonaceous material comprising an intimate bound mixture of carbon black and skeleton of carbonized woody fibers.

6. A carbonaceous material comprising an intimate bound mixture of petroleum carbon and skeleton of carbonized woody fibers.

ALFRED OBERLE.